United States Patent [19]
Reddy et al.

[11] Patent Number: 5,711,898
[45] Date of Patent: *Jan. 27, 1998

[54] IMPROVED BLUE-GREEN EMITTING ZNS:CU,CL ELECTROLUMINESCENT PHOSPHOR AND METHOD OF MAKING SAME

[75] Inventors: Vaddi Butchi Reddy, Sayre; Kenneth T. Reilly, Towanda, both of Pa.

[73] Assignee: Osram Sylvania Inc., Danvers, Mass.

[*] Notice: The term of this patent shall not extend beyond the expiration date of Pat. No. 5,702,643.

[21] Appl. No.: 637,023

[22] Filed: Apr. 24, 1996

[51] Int. Cl.$^6$ .................. C09K 11/54; C09K 11/56
[52] U.S. Cl. .................. 252/301.65; 313/503; 313/509; 428/690
[58] Field of Search .................. 252/701.68; 313/503, 313/509; 428/690

[56] References Cited

U.S. PATENT DOCUMENTS

| | | | |
|---|---|---|---|
| 4,859,361 | 8/1989 | Reilly et al. | 252/301.6 |
| 5,110,499 | 5/1992 | Reilly | 252/301.6 |

FOREIGN PATENT DOCUMENTS

| | | |
|---|---|---|
| 4-270780 | 9/1992 | Japan . |
| WO 91/16722 | 10/1991 | WIPO . |

*Primary Examiner*—Melissa Bonner
*Attorney, Agent, or Firm*—Robert F. Clark; William H. McNeill

[57] ABSTRACT

An improved blue-green emitting ZnS:Cu,Cl phosphor is made by doping the phosphor with small amounts of gold and increasing the amount of low intensity milling between firing steps. The improved phosphor has better halflife and brightness characteristics while maintaining its desired emission color.

14 Claims, 1 Drawing Sheet

IMPROVED BLUE-GREEN EMITTING ZNS:CU,CL ELECTROLUMINESCENT PHOSPHOR AND METHOD OF MAKING SAME

CROSS-REFERENCES TO RELATED APPLICATIONS

This application is related to U.S. application Ser. No. 08/637,146, filed concurrently herewith, which is incorporated herein by reference.

TECHNICAL FIELD

This invention relates to ZnS:Cu,Cl electroluminescent phosphors. More particularly, it relates to a ZnS:Cu,Cl electroluminescent phosphor having improved halflife and brightness characteristics.

BACKGROUND ART

Electroluminescent (EL) phosphors are incorporated into thick film AC electroluminescent devices used for backlighting liquid crystal displays (LCD), for automotive dashboard and control switch illumination, and for emergency egress lighting. Some important characteristics of these EL devices include brightness, color and halflife. Such characteristics depend inherently on the phosphors which are incorporated into the EL devices.

One particularly important class of EL phosphors are the copper-activated zinc sulfide phosphors, ZnS:Cu, which have commercially desirable brightness and color characteristics. Such phosphors may be blue, blue-green, green or yellow-orange (co-activated with manganese) emitting. U.S. Pat. No. 4,859,361 to Reilly et al., which is hereby incorporated by reference, describes generally how to make copper-activated zinc sulfide phosphors. First, the phosphor precursor materials, ZnS, a copper source and a chloride flux are mixed together and heated to form a hexagonal ZnS material containing copper and chlorine ions. Next, the hexagonal ZnS is subjected to low intensity milling to convert some of the hexagonal ZnS to its cubic crystalline form. And finally, the milled material is blended with zinc sulfate and copper sulfate and refired at a lower temperature to form an electroluminescent phosphor.

Attempts have been made to increase the halflife of ZnS:Cu phosphors. For example, JP 4-270780 discloses improving the halflife of a copper-activated zinc sulfide phosphor to about 410 hours by incorporating small amounts of gold into the phosphor. U.S. Pat. No. 5,110,499 to Reilly further improves the halflife of copper-activated zinc sulfide phosphors to about 450 hours by increasing the average particle size of the phosphor. WO 91/16722 to Faria discloses that increasing the mechanically stressing of the hexagonal ZnS material between the first and second firing steps increases the halflife of the phosphor but at the expense of brightness.

Generally, attempts to increase the halflife of these phosphors also result in a shift to higher y color coordinate values resulting in a greener emission color. Such shifts are unacceptable for applications requiring a bluer emission color. Lower copper activator levels will result in a bluer emission but the phosphor halflife is decreased.

Thus, it would be a significant advantage to produce a blue-green emitting copper-activated zinc sulfide EL phosphor having a longer halflife while maintaining or improving the desirable brightness and color characteristics.

SUMMARY OF THE INVENTION

It is an object of the invention to obviate the disadvantages of the prior art.

It is another object of the invention to provide an improved blue-green emitting ZnS:Cu,Cl electroluminescent phosphor having an increased halflife while maintaining desirable brightness and color characteristics.

It is a further object of the invention to provide a method for making an improved blue-green emitting ZnS:Cu,Cl electroluminescent phosphor.

In accordance with one aspect of the invention, there is provided an electroluminescent phosphor having a general formula ZnS:Cu,Cl,Au, a halflife of at least about 470 hours, and x and y color coordinates where the x color coordinate is from about 0.156 to about 0.196 and the y color coordinate is from about 0.370 to about 0.410.

In accordance with another aspect of the invention, there is provided a method for making an electroluminescent phosphor comprising:

blending amounts of zinc sulfide, a copper source, a gold source and a chloride flux to form a mixture;

firing the mixture at a temperature from about 900° C. to about 1400° C. for about 2 hours to about 8 hours to form a zinc sulfide material containing copper, chlorine and gold;

subjecting the zinc sulfide material to a low intensity milling for between about 190 to about 225 minutes to form a milled material;

blending the milled material with an amount of zinc sulfate and an amount of copper sulfate; and refiring the milled material at a temperature from about 500° C. to about 1000° C. for about 1 to about 5 hours to form an electroluminescent phosphor.

In accordance with yet another aspect of the invention, there is provided an electroluminescent lamp comprising:

a first electrode, a first layer of a dielectric material adjacent to the first electrode, a second layer of a dielectric material adjacent to the first layer;

the second layer containing an electroluminescent phosphor having a general formula ZnS:Cu,Cl,Au, a halflife of at least about 470 hours, and x and y color coordinates where the x color coordinate is from about 0.156 to about 0.196 and the y color coordinate is from about 0.370 to about 0.410; and a second electrode adjacent to the second layer of dielectric material.

PREFERRED EMBODIMENTS

Figure 1:
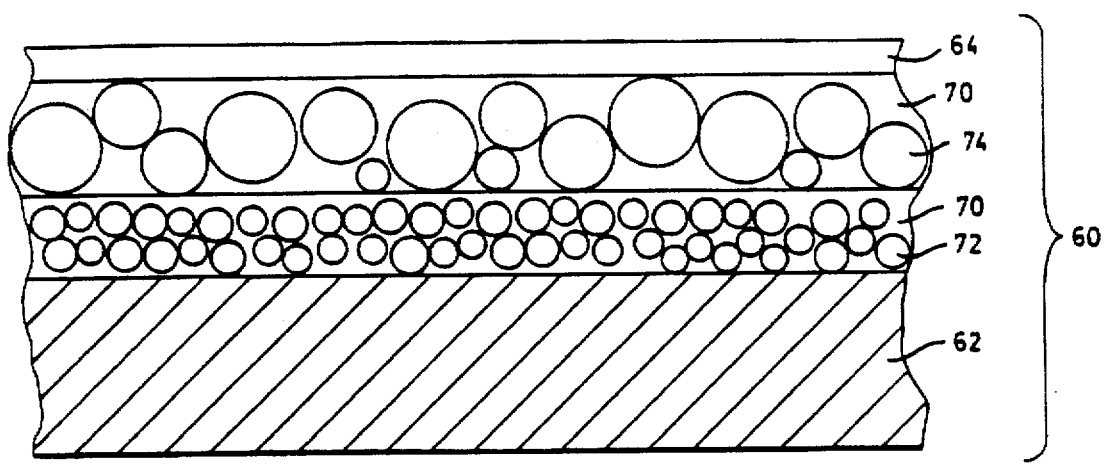
FIG. 1 is a schematic representation of the structure of an electroluminescent lamp.

For a better understanding of the present invention, together with other and further objects, advantages and capabilities thereof, reference is made to the following disclosure and appended claims taken in conjunction with the above-described drawings.

FIG. 1 is a schematic representation of the structure of an electroluminescent lamp 60. A conductive substrate material, such as aluminum or graphite, forms a first electrode 62 of the lamp 60, while a transparent conductive film, such as indium tin oxide, forms a second electrode 64. Sandwiched between the two conductive electrodes 62 and 64 are two additional layers of dielectric material 70 which can be, for example, cyanoethyl cellulose or cyanoethyl starch. Adjacent to the first electrode 62 is a layer of dielectric material 70 in which may be embedded particles of a ferroelectric material 72 such as barium titanate. Adjacent to the second electrode 64 is a layer of dielectric material 70 in which may be embedded particles of the electroluminescent phosphor 74 of this invention.

The halflife of an electroluminescent lamp as used herein is defined as the time it takes for the brightness of the EL lamp to reach half its initial value. The initial brightness of the lamp is typically measured after a 24 hour burn-in period. The burn-in period is used to stabilize the brightness of the lamp and increase the reproducibility of the measurement. Brightness is typically measured in footlamberts (fL) at conditions of 100 volts and 400 hertz.

A common copper-activated zinc sulfide phosphor is ZnS:Cu,Cl which is available from OSRAM SYLVANIA INC. of Towanda, Pa. For example, OSRAM SYLVANIA Type 723 ZnS:Cu,Cl has CIE color coordinates where x is 0.176±0.02 and y is 0.400±0.03. The typical halflife of this phosphor is about 400 hours. The halflife of this phosphor can be improved to between 600–800 hours by increasing its copper content. However, this causes an undesirable color shift in the emission spectrum of phosphor resulting in a green emission color where the y color coordinate is increased to about 0.480 to 0.490. For applications requiring a bluer emitting phosphor, it is desirable to limit the y color coordinate value to no greater than about 0.410. The preferred y range being about 0.370 to about 0.410. The x range is less of a problem and can vary over the wider range of about 0.156 to about 0.196. It is also preferred that the phosphor have a brightness of at least about 30 fL.

We have found that the halflife of this phosphor type can be significantly improved by doping the phosphor with minor amounts of gold and dramatically increasing the amount of low intensity milling between firings. The resultant ZnS:Cu,Cl,Au phosphor has a halflife of at least about 470 hours, exhibits an average increase in brightness of about 11%, and maintains a y color coordinate value between about 0.370 to about 0.410.

In a general method, the phosphor is made by combining zinc sulfide, a copper source, a gold source and a chloride flux. Other components such as sulfur and ZnO may also be added. The mixture is then fired at a temperature from about 900° C. to about 1400° C. for about 2 to about 8 hours to produce hexagonal ZnS containing copper, chlorine and gold. Preferred first step firing conditions are 1100° C. to 1300° C. for 4 to 6.5 hours. Water washing is used to remove any residual chloride flux.

At this point, the ZnS is not yet substantially electroluminescent. In order to make it electroluminescent, the ZnS is subjected to a low intensity milling to induce the transformation of the ZnS to its cubic crystalline form. The amount of low intensity milling used in this method is substantially greater than the amount indicated by the prior art. For example, U.S. Pat. No. 4,859,361 discloses milling for 90 minutes between firings and WO 91/16722 teaches mechanically stressing the phosphor precursor for up to about 120 minutes. In the instant invention, the preferred amount of low intensity milling is between about 190 and about 225 minutes which is at least 50% longer than the prior art.

After milling, the ZnS is blended with amounts of copper sulfate and zinc sulfate and fired at a temperature from about 500° C. to about 1000° C. for about 1 to about 5 hours to form the electroluminescent phosphor. Preferred second step firing conditions are 650° C. to 850° C. for 1.5 to 3 hours. After cooling, the phosphor is given additional washes including washing with acetic acid to remove copper oxide and unreacted ZnO and washing with a KCN solution to remove superficial copper. Final finishing steps include water washing, filtering, drying and sieving to −325 mesh.

The following non-limiting examples are presented to enable those skilled in the art to more clearly understand and practice the present invention. These examples should not be considered as a limitation upon the scope of the present invention, but merely as being illustrative and representative thereof.

Luminescent grade S-10 ZnS from OSRAM SYLVANIA containing 1 wt. % chloride was doped with 0.5 wt. % gold using a solution of gold chloride. Typically, the S-10 ZnS is slurried with deionized (DI) water, the gold chloride solution is added, and then the gold doped slurry is dried. The gold doped S-10 was mixed in varying proportions with amounts of an S-10 ZnS which did not contain chloride to produce ZnS mixtures containing different amounts of gold. The relative proportions of the two S-10 blends are given in Table 1. To each of these mixtures, 23.87 g $CuSO_4$, 1270.06 g S, 79.45 g ZnO, 476.27 g $BaCl_2$, 476.27 $MgCl_2$ and 317.51 g NaCl were added. The latter three components, $BaCl_2$, $MgCl_2$ and NaCl, being flux materials.

The mixtures were fired in covered crucibles at 1205° C. for 5 ¼ hours. The fired cakes were removed from the furnace and washed to remove the flux material. Approximately three hot DI water washes (0.7 gal./lb.) were needed to remove the flux. (The chloride level in the supernatant liquid can be tested by either measuring the conductivity of the liquid or precipitating AgCl with $AgNO_3$.) The washed material was subjected to slight milling using a Simpson Mix-Muller in 35 lb. quantities for different time periods to induce the transformation of hexagonal ZnS to cubic ZnS. The milled material was blended with $ZnSO_4 \cdot 7H_2O$ and $CuSO_4$ in the ratio of 1159 g of $ZnSO_4 \cdot 7H_2O$ and 113.5 g of $CuSO_4$ per every 10 lbs. of milled material and fired in an electric furnace for about 2¼ hours at 730° C. After firing, the fired cakes were removed from the furnace, cooled to room temperature, blended and washed with DI water. After two or three DI water washes, the material was washed with acetic acid (1 gal. glacial acetic acid/5 gal. DI water) to remove copper oxide and unreacted ZnO. After subsequently washing at least twice with DI water, the material was washed with KCN (2 lbs. KCN/5 gal. DI water) to remove most of the superficial copper from the phosphor. The KCN wash changes the body color of the material from a dark gray to almost colorless. The phosphor is then washed with DI water, filtered, dried and sieved to −325 mesh. The phosphors were then incorporated into conventional thick film EL devices and evaluated for brightness, halflife and color. The results of which are given in Table 2. A Type 723 control sample made using without the gold dopant or the longer milling period is provided for comparison.

TABLE 1

| No. | Au-doped S-10 with 1 wt. % Cl (g) | S-10 with no Cl (g) | Milling Time (min) |
| --- | --- | --- | --- |
| 1 | 142.88 | 15732.85 | 200 |
| 2 | 95.25 | 15780.48 | 225 |
| 3 | 142.88 | 15732.85 | 250 |
| 4 | 47.63 | 15828.10 | 200 |
| 5 | 95.25 | 15780.48 | 225 |
| 6 | 95.25 | 15780.48 | 260 |
| 7 | 162.38 | 15713.35 | 225 |
| 8 | 95.25 | 15780.48 | 225 |
| 9 | 95.25 | 15780.48 | 225 |
| 10 | 47.63 | 15828.10 | 250 |

TABLE 1-continued

| No. | Au-doped S-10 with 1 wt. % Cl (g) | S-10 with no Cl (g) | Milling Time (min) |
|---|---|---|---|
| 11 | 95.25 | 15780.48 | 190 |
| 12 | 95.25 | 15780.48 | 225 |
| 13 | 28.12 | 15847.61 | 225 |

TABLE 2

| Sample No. | wt. % gold | Milling Time (min) | Initial Brightness (fL) | x color coordinate | y color coordinate | Halflife (h) |
|---|---|---|---|---|---|---|
| Control | 0.00 | 85 | 29.4 | 0.176 | 0.392 | 392 |
| 1 | 0.0045 | 200 | 32.1 | 0.193 | 0.409 | 595 |
| 2 | 0.003 | 225 | 33.8 | 0.183 | 0.400 | 509 |
| 3 | 0.0045 | 250 | 34.4 | 0.188 | 0.448 | 919 |
| 4 | 0.0015 | 200 | 32.1 | 0.183 | 0.402 | 606 |
| 5 | 0.003 | 225 | 32 | 0.184 | 0.404 | 487 |
| 6 | 0.003 | 260 | 33.3 | 0.187 | 0.416 | 581 |
| 7 | 0.00512 | 225 | 32.3 | 0.181 | 0.391 | 496 |
| 8 | 0.003 | 225 | 33.1 | 0.183 | 0.399 | 551 |
| 9 | 0.003 | 225 | 32.6 | 0.183 | 0.400 | 606 |
| 10 | 0.0015 | 250 | 28.2 | 0.173 | 0.362 | 320 |
| 11 | 0.003 | 190 | 32.2 | 0.183 | 0.393 | 485 |
| 12 | 0.003 | 225 | 32.5 | 0.186 | 0.405 | 557 |
| 13 | 0.0088 | 225 | 33 | 0.184 | 0.392 | 412 |

The results given in Table 2 show that milling times equal to or greater than 250 minutes, samples 3, 6 and 10, produce phosphors which have a y color coordinate outside of the desired range, about 0.370 to about 0.410. Therefore, considering only the samples having milling times from about 190 to about 225 minutes, the average halflife of the Type 723 phosphor samples is 530±60 hours which is about a 35 percent increase over the control sample and the average initial brightness is increased by about 11 percent over the control sample to 32.6±0.6 fL. With regard to the emission color, the average x color coordinate is 0.184±0.003 which is an increase of only 0.008 over the control and the average y color coordinate is 0.400±0.006 which is also only an increase of about 0.008. Both color coordinates are still within the desired limits for bluer emitting applications while there have been significant improvements in halflife and brightness.

Chemical analysis of the phosphor samples found that for all samples the chlorine concentration was about 0.03 wt. % and the copper concentration was about 0.05 wt. %. Unexpectedly, the amount of gold detected in the phosphors was considerably less than the amount added to the each initial mixture before firing. The amount of gold detected in the phosphors ranged from 0.27 to 1.7 ppm whereas the amount of gold added initially ranged from 15 to 88 ppm. Excluding samples 3, 6 and 10 which exhibited undesirable color shifts in the y color coordinate, the average gold concentration in the phosphors was about 0.5±0.2 ppm.

While there has been shown and described what are at the present considered the preferred embodiments of the invention, it will be obvious to those skilled in the art that various changes and modifications may be made therein without departing from the scope of the invention as defined by the appended claims.

We claim:

1. An electroluminescent phosphor having a general formula ZnS:Cu,Cl,Au, a halflife of at least about 470 hours, and x and y color coordinates where the x color coordinate is from about 0.156 to about 0.196 and the y color coordinate is from about 0.370 to about 0.410.

2. The electroluminescent phosphor of claim 1 wherein the phosphor has a brightness of at least about 30 fL.

3. The electroluminescent phosphor of claim 1 wherein the phosphor has a halflife of at least about 530 hours.

4. The electroluminescent phosphor of claim 1 wherein the phosphor has a y color coordinate of about 0.400±0.006.

5. The electroluminescent phosphor of claim 1 wherein the amount of gold in the phosphor is about 0.5±0.2 ppm.

6. The electroluminescent phosphor of claim 1 wherein the phosphor has a copper concentration about 0.05 wt. % and a chlorine concentration of about 0.03 wt. %.

7. A method for making an electroluminescent phosphor comprising:

blending amounts of zinc sulfide, a copper source, a gold source and a chloride flux to form a mixture;

firing the mixture at a temperature from about 900° C. to about 1400° C. for about 2 hours to about 8 hours to form a zinc sulfide material containing copper, chlorine and gold;

subjecting the zinc sulfide material to a low intensity milling for between about 190 to about 225 minutes to form a milled material;

blending the milled material with an amount of zinc sulfate and an amount of copper sulfate; and refiring the blended milled material at a temperature from about 500° C. to about 1000° C. for about 1 to about 5 hours to form an electroluminescent phosphor.

8. The method of claim 7 wherein the amount of gold in the mixture is from about 15 to 88 ppm.

9. An electroluminescent lamp comprising:

a first electrode, a first layer of a dielectric material adjacent to the first electrode, a second layer of a dielectric material adjacent to the first layer;

the second layer containing an electroluminescent phosphor having a general formula ZnS:Cu,Cl,Au, a halflife of at least about 470 hours, and x and y color coordinates where the x color coordinate is from about 0.156 to about 0.196 and the y color coordinate is from about 0.370 to about 0.410; and a second electrode adjacent to the second layer of dielectric material.

10. The electroluminescent lamp of claim 9 wherein the phosphor has a brightness of at least about 30 fL.

11. The electroluminescent lamp of claim 9 wherein the phosphor has a halflife of at least about 530 hours.

12. The electroluminescent lamp of claim 9 wherein the phosphor has a y color coordinate of about 0.400±0.006.

13. The electroluminescent lamp of claim 9 wherein the amount of gold in the phosphor is about 0.5±0.2 ppm.

14. The electroluminescent lamp of claim 9 wherein the phosphor has a copper concentration about 0.05 wt. % and a chlorine concentration of about 0.03 wt. %.

* * * * *